United States Patent Office 3,478,017
Patented Nov. 11, 1969

3,478,017
N-FLUORINATED SUBSTITUTED AZIRIDINES
Carl C. Thurman, Jr., Lake Jackson, Tex., assignor to
The Dow Chemical Company, Midland, Mich., a corporation of Delaware
No Drawing. Filed May 11, 1962, Ser. No. 194,187
Int. Cl. C07d 23/06
U.S. Cl. 260—239  6 Claims This invention is concerned with new chemical compounds, a process for making them, and new polymeric compositions obtainable therefrom. More specifically, it relates to a new class of substituted aziridines produced by the reaction of $\alpha,\beta$ lower alkylene imines with polyfluorinated olefinic compounds and to polymers thereof.

It is known that $\alpha,\beta$ alkylene imines such as ethylenimine and propylenimine which have an unsubstituted nitrogen atom will react by adding at the nitrogen atom to an activated olefinic double bond in compounds such as butadiene, styrene, and alkyl acrylates and crotonates, thereby forming the corresponding N-substituted aziridines. Although the reaction will sometimes take place when the reactants are merely contacted at ordinary temperatures, it is often necessary to apply heat or employ a catalyst such as an alkali metal, a metal amide, or a metal alcoholate.

It has now been found that the presumably relatively inactive double bond in certain polyfluorinated olefinic compounds will react in a similar manner with $\alpha,\beta$ alkylene imines and it has been found further that this reaction proceeds smoothly in the absence of a catalyst and at or only slightly above normal room temperature. The polyfluorinated olefinic compounds found to be reactive as stated have the structure

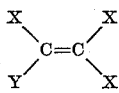

wherein each X is independently selected from the group consisting of fluorine and perfluorinated lower alkyl radicals containing from one to about four carbon atoms and Y is selected from the group consisting of hydrogen, halogen, cyano and perfluorinated lower alkyl radicals of 1–4 carbon atoms. The alkylene imines with which these compounds react are represented by the structure

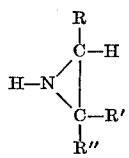

wherein R and R' are hydrogen or methyl and R" is hydrogen or lower alkyl of 1–4 carbon atoms. The imines thereby represented include ethylenimine, propylenimine, 1,2 - butylenimine, 2,3 - butylenimine, 2,2 - dimethylethylenimine, and similar compounds.

The reaction product is an aziridine having a fluorinated alkyl radical attached to the nitrogen atom. A molecule of hydrogen fluoride may split from the alkyl radical in the course of the reaction and the corresponding fluorinated alkenyl aziridine is thereby formed. The tendency to split out HF from the molecule increases with the size and complexity of the alkyl group and in many cases, an appreciable amount of splitting occurs spontaneously, yielding a reaction product which is at least in part the alkenyl compound. The product may, therefore, be represented by the general formula

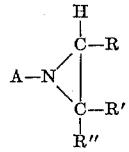

wherein A is one of the radicals

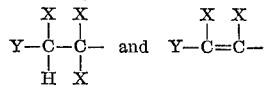

and the symbols X, Y, R, R', and R" represent groups as defined above.

The polyfluorinated olefins described above may be prepared by a number of methods known to be useful in this general field of chemistry. Suitable means include the pyrolysis of fluorinated lower aliphatic hydrocarbons, the reaction of carbon with fluorinated hydrocarbons under appropriate conditions, and the reaction of fluorinated hydrocarbons with other halogenated hydrocarbons or other fluorides at high temperatures. For example, trifluoroacrylonitrile can be made by a method described in U.S. 2,730,543 wherein a perfluoroolefin is reacted with an alcohol to make an ether which is converted by hydrolysis of the alpha-fluorine atoms to the corresponding ester, and the ester is transformed into the nitrile by the conventional route through the amide and the saturated nitrile. The preparation of perfluoro-2-methyl-2-pentene is described by Dresdner et al., J. Am. Chem. Soc. 82, 5833 (1960), the reaction involving contacting perfluoropropylene with nitrogen fluoride in the presence of cesium fluoride at elevated temperatures.

The imine-polyfluorinated olefin reaction proceeds smoothly when the reactants are contacted in the liquid state at temperatures from about $-70°$ C. to about $60°$ C. under atmospheric or superatmospheric pressure. Normally, and preferably, the reaction is carried out at a temperature of 0–45° C. under atmospheric pressure or the autogenous pressure of the system. While most of the polyfluorinated olefins described will react at room temperature or below, it is necessary to warm the reaction mixture to about 40° C. when tetrafluoroethylene is being reacted. Under the reaction conditions described, vinyl fluoride and vinylidene fluoride do not react with alkylene imines.

At least about one mole of olefin per mole of imine is used in the preparation of these compounds Preferably, from 1.05 to about 2.0 moles of olefin are employed per mole of imine for best results.

Inert organic solvents such as hexane, benzene, cyclohexane, fluorinated saturated hydrocarbons, and diethyl ether may be used in the reaction mixture, but their presence is usually not desirable.

The separation of the product from the reaction mixture is usually accomplished by venting or vaporizing off any excess flourinated olefin and filtering or decanting to remove any solid polymer which may be formed. The product may then be separated and purified if desired by distillation, extraction, or by chromatographic methods. Because of the tendency of these new compounds to polymerize or to lose a molecule of HF, thereby forming a fluorinated alkenyl aziridine, any distillation is preferably done at as low temperature and in as short a time as possible. The unsaturated compounds formed by the splitting out of HF in some of these preparations, although having properties similar to those of the corresponding saturated compounds, are nevertheless separable from them by the methods mentioned. Vapor phase chromatographic separation is often an advantageous procedure.

The purified compounds are clear colorless liquids with a characteristic ammoniacal odor. The preparation and the properties of representative compounds are described in the following examples.

Example 1

A stainless steel pressure reactor equipped with a pressure gauge and pressure relief means was evacuated and cooled to liquid nitrogen temperature. To the evacuated reactor there was added in sequence 193 g. of perfluoropropylene ($C_3F_6$) and 48 g. of ethylenimine. The reactor was then allowed to warm to room temperature while being rotated to agitate the reaction mixture. After two hours, the reactor was opened and 8.9 g. unreacted propylene was vented off and collected. The reaction product consisted of 16.5 g. of polymeric solid and 210 g. of a yellowish liquid of ammoniacal odor. This liquid was analyzed by infrared spectroscopy and by mass spectrophotometry and was found to be a mixture of 84.6 percent by weight of 1-(1,1,2,3,3,3-hexafluoropropyl)aziridine and 15.4 percent of 1 - (1,2,3,3,3 - pentafluoro-1-propenyl)-aziridine. A sample of 1-(1,1,2,3,3,3-hexafluoropropyl)aziridine purified by vapor phase chromatography was a colorless liquid having a boiling point of 93.9° C. and a refractive index, $n_D^{25}=1.3215$. The unsaturated compound was also a liquid having similar properties.

Example 2

In a reactor similar to but smaller than that used in Example 1, 42.3 g. of bromotrifluoroethylene and 8.2 g. of ethylenimine were combined under the previously described conditions. After two hours, 10.5 g. of unreacted bromotrifluoroethylene was removed from the reactor, leaving 36.0 g. of liquid which was found to be better than 90 mole percent of 1-(2-bromo-1,1,2-trifluoroethyl)aziridine. A purified sample of this compound was a clear, yellowish liquid of ammoniacal odor and having a boiling point of 133° C., refractive index $n_D^{25}$ 1.4118.

Example 3

As shown in Example 2, 23.5 g. of chlorotrifluoroethylene and 5.55 g. of ethylenimine were combined and allowed to react for two hours while the reactor was warming to room temperature. Excess, unreacted chlorotrifluoroethylene amounting to 4.9 g. was then removed from the reactor and collected. The product of reaction was a liquid, 14.5 g. in quantity, proving upon analysis to be 90–95 mole percent 1-(2-chloro-1,1,2-trifluoroethyl)aziridine. A purified sample had a boiling point 112° C., refractive index $n_D^{25}$ 1.3825.

Example 4

As shown in the above examples, 24 g. of tetrafluoroethylene and 5.88 g. of ethylenimine were combined and allowed to warm to room temperature. The reaction mixture was then heated further to about 45° C. After a reaction time of 3 hours, the reactor was opened and 2.8 g. of unreacted tetrafluoroethylene was recovered. The liquid reaction product amount to 12.5 grams and was found by analysis to be 90–95 mole percent 1-(1,1,2,2-tetrafluoroethyl)aziridine. A purified sample had B.P. 80° C., $n_D^{25}$ 1.3324.

Example 5

By the procedure described in Examples 1–3, 13.8 g. of perfluoro-2-methyl-2-pentene and 1.6 g. of ethylenimine were mixed and allowed to react. Essentially all of the ethylenimine reacted and a clear liquid of ammoniacal odor was formed which was found to consist largely of 1 - (2,3,3,4,4,4 - hexafluoro - 1,1 - bis(trifluoromethyl)-butyl)aziridine with a minor proportion of 1-(2,3,4,4,4-pentafluoro - 1,1-bis(trifluoromethyl)-2-butenyl)aziridine. These compounds, which have closely similar properties, are separable as described above.

Example 6

Trifluoroethylene and ethylenimine were reacted by combining 4 ml. of the olefin with 0.5 ml. of the imine in a test tube at —45° C. The materials reacted immediately and the temperature of the mixture rose to room temperature in about one minute, whereupon the reaction appeared complete. Evaporation of excess trifluoroethylene left a clear ammoniacal liquid which was identified by infrared and mass spectroscopic examination as being largely 1-(1,2-difluorovinyl)aziridine with a small amount of 1-(1,1,2-trifluoroethyl)aziridine. Vapor phase chromatography is a suitable method for separation and purification of these compounds.

Example 7

As in Example 6, 4 ml. of trifluoroacrylonitrile and 0.5 ml. of ethylenimine were combined and allowed to react to completion. The product was a clear liquid of characteristic odor. It was found by infrared and mass spectroscopic analysis ot consist essentially of 1-(2-cyano-1,1,2-trifluoroethyl)aziridine.

Example 8

Excess perfluoropropylene was mixed with propylenimine in the liquid state and allowed to react, the mixture warming rapidly to about room temperature in the process. Removal of the excess perfluoropropylene left a residue of a clear ammoniacal liquid which was found by spectroscopic analysis as before to consist largely of 1-(1,2,3,3,3-hexafluoropropyl)-2-methylaziridine with some 1-(1,2,3,3,3-pentafluoro-1-propenyl)-2-methylaziridine.

In a similar manner, perfluoropropylene and other fluorinated olefinically unsaturated compounds as shown in the foregoing examples react with other $\alpha,\beta$-alkylene imines such as 1,2-butylenimine, 2,3-butylenimine, and 2,2-dimethylaziridine to produce the corresponding N-substituted aziridines. For example, when combined as shown above, tetrafluoroethylene and 1,2-butylenimine react to form 2-ethyl-1-(1,1,2,2-tetrafluoroethyl)-aziridine, bromotrifluoroethylene and 2,3-butylenimine react to form 1 - (2- -bromo-1,1,2-trifluoroethyl)2,3-dimethylaziridine, and chlorotrifluoroethylene reacts with 2,2-dimethylaziridine to form 1-(2-chloro-1,1,2-trifluoroethyl)-2,2-dimethylaziridine, all as principal products of the reaction. Similarly, compounds such as 1-(1,1,2-trifluoroethyl)-2-methylaziridine,
1-(2-cyano-1,1,2-trifluoroethyl)-2-methylaziridine,
1-(1,1,2,3,3,3-hexafluoropropyl)-2-methylaziridine and
1-(2-chloro-1,1,2-trifluoroethyl)-2-methylaziridine
are easily made.

These compounds are useful as additives to textile fibers, paper, and paper products to improve their physical properties. For example, the dry strength of Whatman No. 1 filter paper was greatly increased by wetting a sample with 1-(1,1,2,3,3,3-hexafluoropropyl)-aziridine and allowing it to air-dry. Comparative strength tests are shown in Table I.

TABLE I

| Test Strip | Burst Strength, lbs./sq. in. | Ultimate Tensile Strength, lbs./sq. in. |
|---|---|---|
| Untreated | 7 | 1,280 |
| Treated | 38 | 3,325 |

Similar results are obtained with the other related substituted aziridines described herein.

These aziridines are also useful as monomers which are easily polymerized to liquid or solid polymers by addition of an acid such as HF, $BF_3$, HCl, $H_2SO_4$, or trichloroacetic acid, by application of heat, as in distillation, or to some extent even by being allowed to stand at room temperature. As typical examples, 1-(1,1,2,3,3,3-hexafluoropropyl)aziridine and 1 - (2 - bromo-1,1,2-trifluoroethyl)

aziridine were each polymerized by the addition of a small quantity of HCl at room temperature. An exothermic polymerization occurred which was controlled by moderate cooling, yielding in each case a clear viscous liquid polymer. These liquids formed clear adherent films when applied to glass or metal and allowed to dry. The films were water sensitive but not water-soluble.

By more strenuous conditions, polymers of increased strength and chemical resistance are obtained. When the fluorinated substituted aziridines described in this specification are heated at reflux temperature over a period of hours, tenaciously adherent polymeric films are formed on the inner surfaces of the flask and reflux column. These films are not affected by boiling organic solvents and resist even chromic acid cleaning solution. This procedure, may, therefore, be used to cover glass, metal, or other surfaces with a tough adherent inert coating.

I claim:

1. A compound of the formula

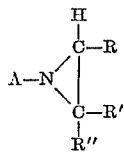

wherein R and R' are selected from the group consisting of hydrogen and methyl, R'' is selected from the group consisting of hydrogen and alkyl radicals containing from one to four carbon atoms, and A is a radical selected from the group consisting of

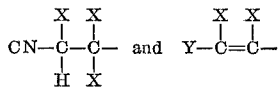

wherein each X is selected from the group consisting of fluorine and perfluorinated alkyl containing from one to four carbon atoms, and Y is selected from the group consisting of hydrogen, halogen, cyano, and perfluorinated alkyl containing from one to four carbon atoms.

2. 1-(2-cyano-1,1,2-trifluoroethyl)aziridine.
3. 1-(1,2,3,3,3-pentafluoro-1-propenyl)aziridine.
4. 1-(1,2-difluorovinyl)aziridine.
5. 1 - (2,3,4,4,4 - pentafluoro - 1,1 - bis(trifluoromethyl)-2-butenyl)aziridine.
6. 1-(1,2,3,3,3-pentafluoro - 1 - propenyl)-2-methylaziridine.

References Cited

UNITED STATES PATENTS 3,057,864  10/1962  Shulgin.

OTHER REFERENCES

Brace: Journal of Organic Chemistry, vol. 26, No. 10, October 1961, p. 4008.

ALTON D. ROLLINS, Primary Examiner

U.S. Cl. X.R.

117—161; 260—2, 88.3